United States Patent
Sarferaz

(10) Patent No.: US 9,734,221 B2
(45) Date of Patent: *Aug. 15, 2017

(54) IN MEMORY DATABASE WAREHOUSE

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 130 days.

This patent is subject to a terminal disclaimer.

(21) Appl. No.: 14/025,574

(22) Filed: Sep. 12, 2013

(65) Prior Publication Data

US 2015/0074037 A1    Mar. 12, 2015

(51) Int. Cl.
  *G06F 17/00* (2006.01)
  *G06F 17/30* (2006.01)

(52) U.S. Cl.
  CPC .... *G06F 17/3056* (2013.01); *G06F 17/30312* (2013.01)

(58) Field of Classification Search
  CPC ......... G06F 17/30286; G06F 17/30315; G06F 17/30392; G06F 17/3048; G06F 17/30424; G06F 17/30442; G06F 17/30477; G06F 17/30389; G06Q 10/06; G06Q 10/0833; Y10S 707/922; Y10S 707/99943
  See application file for complete search history.

(56) References Cited

U.S. PATENT DOCUMENTS

| | | | |
|---|---|---|---|
| 5,276,870 A | * | 1/1994 | Shan et al. |
| 5,918,225 A | | 6/1999 | White et al. |
| 6,148,308 A | | 11/2000 | Neubauer et al. |
| 6,457,021 B1 | | 9/2002 | Berkowitz et al. |
| 6,502,133 B1 | | 12/2002 | Baulier et al. |
| 7,099,898 B1 | | 8/2006 | Nakamura et al. |
| 7,103,586 B2 | | 9/2006 | Holenstein et al. |
| 7,305,421 B2 | | 12/2007 | Cha et al. |
| 7,350,033 B2 | | 3/2008 | Hofmann et al. |
| 7,444,342 B1 | | 10/2008 | Hall et al. |
| 7,720,804 B2 | | 5/2010 | Fazal et al. |

(Continued)

FOREIGN PATENT DOCUMENTS

| | | |
|---|---|---|
| EP | 1537510 A1 | 3/2004 |
| EP | 2040180 A1 | 3/2009 |

(Continued)

OTHER PUBLICATIONS

Analytics on Historical Data Using a Clustered Insert-Only In-Memory Column Database, 16th International Conference on Industrial Engineering and Engineering Management, pp. 704-708, 2009, authors: Schaffner et al.*

(Continued)

*Primary Examiner* — Augustine K Obisesan
(74) *Attorney, Agent, or Firm* — Schwegman Lundberg & Woessner, P.A.

(57) ABSTRACT

An in memory database system includes a random access memory to store an in memory database table, a stored set of defined views over the database tables, a stored set of analytical services adapted to provide transaction services and database warehouse services, an engine to run the analytical services on the database table, and an interface to interact with users and provide access to the engine, analytical services, and views to perform transactions and data warehouse functions on the database table.

23 Claims, 8 Drawing Sheets

(56) References Cited

U.S. PATENT DOCUMENTS

| | | |
|---|---|---|
| 7,765,185 B2 | 7/2010 | Rangadass |
| 8,010,554 B1 | 8/2011 | Zhou |
| 8,010,582 B2 | 8/2011 | Zimowski |
| 8,219,518 B2 | 7/2012 | Jin et al. |
| 8,224,791 B2 | 7/2012 | Rieger |
| 8,229,952 B2 | 7/2012 | Cras et al. |
| 8,327,351 B2 | 12/2012 | Paladino et al. |
| 8,412,690 B2 | 4/2013 | Hermann et al. |
| 8,510,261 B1 | 8/2013 | Samantray |
| 8,738,568 B2 | 5/2014 | Ghosh et al. |
| 8,745,012 B2 | 6/2014 | Rusher |
| 8,813,022 B2 | 8/2014 | Rallapalli et al. |
| 8,868,510 B2 | 10/2014 | Gurajada et al. |
| 8,880,542 B2 | 11/2014 | Hughes |
| 2002/0087500 A1 | 7/2002 | Berkowitz et al. |
| 2002/0174138 A1* | 11/2002 | Nakamura et al. ......... 707/200 |
| 2003/0164857 A1* | 9/2003 | Warren ............ G06F 17/30994 715/764 |
| 2003/0212789 A1 | 11/2003 | Hamel et al. |
| 2003/0225742 A1 | 12/2003 | Tenner et al. |
| 2004/0010502 A1 | 1/2004 | Bomfim et al. |
| 2004/0143562 A1* | 7/2004 | Chen ................ G06F 17/30595 |
| 2005/0044197 A1 | 2/2005 | Lai |
| 2005/0165733 A1 | 7/2005 | Strovink |
| 2005/0203946 A1 | 9/2005 | Pauly et al. |
| 2006/0047713 A1 | 3/2006 | Gornshtein et al. |
| 2006/0074946 A1 | 4/2006 | Pham |
| 2006/0235840 A1* | 10/2006 | Manikutty et al. ............... 707/4 |
| 2007/0124275 A1 | 5/2007 | Mishra |
| 2007/0192078 A1* | 8/2007 | Nasle ................ G05B 23/0254 703/14 |
| 2007/0239790 A1* | 10/2007 | Cattell ................ G06F 11/1666 |
| 2007/0266000 A1* | 11/2007 | Piedmonte ........ G06F 17/30424 |
| 2007/0294205 A1 | 12/2007 | Xu et al. |
| 2008/0034015 A1 | 2/2008 | Behnen et al. |
| 2008/0140620 A1* | 6/2008 | Bender ............... G06F 21/6227 |
| 2008/0172661 A1 | 7/2008 | Chatterjee et al. |
| 2008/0222150 A1* | 9/2008 | Stonecipher ....................... 707/8 |
| 2008/0222159 A1 | 9/2008 | Aranha et al. |
| 2008/0288522 A1* | 11/2008 | Hunt et al. ..................... 707/101 |
| 2009/0018996 A1 | 1/2009 | Hunt et al. |
| 2009/0204517 A1 | 8/2009 | Edens et al. |
| 2009/0240663 A1 | 9/2009 | Plattner et al. |
| 2009/0327568 A1 | 12/2009 | Wayda et al. |
| 2010/0274759 A1 | 10/2010 | Takeuchi et al. |
| 2010/0332495 A1 | 12/2010 | Richter et al. |
| 2011/0060753 A1* | 3/2011 | Shaked ............. G06F 17/30551 707/769 |
| 2011/0153568 A1 | 6/2011 | Shang et al. |
| 2011/0252000 A1 | 10/2011 | Diaconu et al. |
| 2011/0252124 A1 | 10/2011 | Bonner et al. |
| 2011/0282704 A1* | 11/2011 | Graeber et al. ............... 705/7.11 |
| 2012/0166422 A1* | 6/2012 | Harren et al. ................. 707/718 |
| 2012/0166620 A1 | 6/2012 | Said et al. |
| 2012/0173589 A1* | 7/2012 | Kwon et al. ................... 707/803 |
| 2012/0174013 A1* | 7/2012 | Kraus et al. ................... 715/771 |
| 2012/0259809 A1 | 10/2012 | Hermann et al. |
| 2012/0265728 A1 | 10/2012 | Plattner et al. |
| 2012/0284228 A1* | 11/2012 | Ghosh et al. ................. 707/615 |
| 2012/0323971 A1 | 12/2012 | Pasupuleti |
| 2013/0013552 A1 | 1/2013 | Eshleman et al. |
| 2013/0041789 A1 | 2/2013 | Klensch |
| 2013/0066678 A1 | 3/2013 | May et al. |
| 2013/0073513 A1 | 3/2013 | Kemper et al. |
| 2013/0124473 A1 | 5/2013 | Gutberlet et al. |
| 2013/0138418 A1 | 5/2013 | Finke et al. |
| 2013/0166497 A1* | 6/2013 | Schroetel et al. ............ 707/602 |
| 2013/0339801 A1 | 12/2013 | Ramaiah |
| 2014/0040182 A1 | 2/2014 | Gilder et al. |
| 2014/0095540 A1* | 4/2014 | Hsiao et al. .................. 707/774 |
| 2014/0156344 A1* | 6/2014 | D'Cruz ............... G06Q 10/063 705/7.29 |
| 2014/0156634 A1* | 6/2014 | Buchmann et al. ........... 707/714 |
| 2014/0172788 A1 | 6/2014 | Haase et al. |
| 2014/0214753 A1 | 7/2014 | Guerra |
| 2014/0279839 A1 | 9/2014 | Balzar et al. |
| 2014/0310232 A1 | 10/2014 | Plattner et al. |
| 2015/0074038 A1 | 3/2015 | Sarferaz |
| 2015/0074053 A1 | 3/2015 | Sarferaz |

FOREIGN PATENT DOCUMENTS

| | | |
|---|---|---|
| WO | WO-2009037363 A1 | 3/2009 |
| WO | WO-2012125166 A1 | 9/2012 |

OTHER PUBLICATIONS

Data Structures for MixedWorkloads in In-Memory Databases, 5th International Conference on Computer Sciences and Convergence Information Technology (ICCIT), pp. 394-399, 2010 , authors: Krueger et al.*

In-Memory Databases: An industry perspective, Second International Workshop onResearch Issues on Data Engineering, 1992: Transaction and Query Processing, pp. 96-101, 1992, authors: Pizzarello et al.*

Virtualization of physical changes on a database and automated backup, An IP.com Prior Art Database Technical Disclosure, Jun. 6, 2006, authors et al: IBM.*

SIREN: a memory-conserving, snapshot-consistent checkpoint algorithm for in-memory databases, Proceedings of the 22nd International Conference on Data Engineering (ICDE'06), pp. 99, 2006, authors: Liedes et al.*

SAP HANA Distributed In-Memory Database System: Transaction, Session, and Metadata Management, 29th International Conference on Data Engineering (ICDE), pp. 1165-1173, Apr. 2013, authors: Lee et al.*

Predicting In-Memory Database Performance for Automating Cluster Management Tasks, 27th International Conference on Data Engineering (ICDE), pp. 1264-1275, 2011, authors: Schaffner et al.*

Applying the virtual data provenance model, Zhao et al, IPAW, LNCS 4145, pp. 148-161, 2006.*

Tracking provenance in a virtual data grid, Clifford et al., Concurrency and computation practice and experience, 20(5), pp. 565-575, Apr. 2008.*

Virtual Frameworks—Modeling Data Dynamically, Birmingham et al., Software Development on a Leash, 2002.*

"U.S. Appl. No. 14/025,597, Non Final Office Action dated Aug. 15, 2016", 16 pgs.

"U.S. Appl. No. 14/025,610, Examiner Interview Summary dated Mar. 10, 2016", 3 pgs.

"U.S. Appl. No. 14/025,610, Examiner Interview Summary dated Nov. 6, 2015", 3 pgs.

"U.S. Appl. No. 14/025,610, Final Office Action dated Jan. 13, 2016", 18 pgs.

"U.S. Appl. No. 14/025,610, Final Office Action dated Aug. 22, 2016", 27 pgs.

"U.S. Appl. No. 14/025,610, Non Final Office Action dated Mar. 24, 2016", 21 pgs.

"U.S. Appl. No. 14/025,610, Non Final Office Action dated Jul. 30, 2015", 18 pgs.

"U.S. Appl. No. 14/025,610, Response filed Feb. 26, 2016, to Final Office Action dated Jan. 13, 2016", 10 pgs.

"U.S. Appl. No. 14/025,610, Response filed May 20, 2016 to Non Final Office Action dated Mar. 24, 2016", 13 pgs.

"U.S. Appl. No. 14/025,610, Response filed Oct. 20, 2015 to Non Final Office Action dated Jul. 30, 2015", 11 pgs.

"European Application Serial No. 14183887.0, Office Action dated Oct. 13, 2015", 5 pgs.

"European Application Serial No. 14183887.0, Search Report dated Mar. 3, 2015", 7 pgs.

"European Application Serial No. 14183888.8, Search Report dated Mar. 2, 2015", 7 pgs.

Ahmed, Tanvir, et al., "A Data Warehouse Solution for Analyzing RFID-Based Baggage Tracking Data", IEEE 14th International Conference on Mobile Data Management, (Jun. 3, 2013), 283-292.

(56) References Cited

OTHER PUBLICATIONS

Aulbach, et al., "Multi-Tenant database for software as a service: Schema-mapping techniques", SIGMOD, (2008), 1195-1206.
Faber, et al., "An In-Memory Database System for Multi-Tenant Applications", BTW, (2011), 650-666.
Kotidis, Yannis, "Extending the Data Warehouse for Service Provisioning Data", Data & Knowledge Engineering, vol. 59, No. 3, (2006), 700-724.
Maddodi, Srivatsa, et al., "Data Deduplication Techniques and Analysis", Third International Conference on Emerging Trends in Engineering and Technology, (2010), 664-668.
Plattner, et al., "A common database appraoch for OLTP and OLAP using an In-Memory column database", SIGMOD, (Jun. 29-Jul. 2, 2009), 7 pgs.
"U.S. Appl. No. 14/025,597, Response filed Nov. 2, 2016 to Non Final Office Action dated Aug. 15, 2016", 12 pgs.
"U.S. Appl. No. 14/025,610, Examiner Interview Summary dated Nov. 3, 2016", 3 pgs.
"U.S. Appl. No. 14/025,610, Non Final Office Action dated Jan. 27, 2017", 28 pgs.
"U.S. Appl. No. 14/025,610, Response filed Oct. 25, 2016 to Final Office Action dated Aug. 22, 2016", 15 pgs.
"U.S. Appl. No. 14/025,597, Notice of Allowance dated Apr. 28, 2017", 7 pgs.
"U.S. Appl. No. 14/025,610, Examiner Interview Summary dated Mar. 15, 2017", 3 pgs.
"U.S. Appl. No. 14/025,610, Response filed Mar. 14, 2017 to Non Final Office Action dated Jan. 27, 2017", 15 pgs.
"Empower Business Users to Make Data-Driven Decisions", Self-Service Business Intelligence (BI) | Birst BI, [Online]. Retrieved from the Internet: <URL: http://www.birst.com/product>, (Accessed Aug. 5, 2013), 4 pgs.
"The Kognito Analytical Platform", [Online]. Retrieved from the Internet: <URL: http://www.kognitio.com/analyticalplatform/>, (Accessed Aug. 5, 2013), 5 pgs.
"Under the Hood: How ActivePivot Delivers Real-Time Analytics: The Innovative Technologies Enabling Hybrid Transactional and Analytical Applicaitons", Quartet Financial Systems. Technical White Paper, (2012), 10 pgs.
Grund, Martin, et al., "HYRISE—A Main Memory Hybrid Storage Engine", Proceedings of the VLDB Endowment. vol. 4, Issue 2, (Nov. 2010), 105-116.
Murthy, Vasu, et al., "Oracle Exalytics In-Memory Machine: A Brief Introduction", An Oracle White Paper, (Jul. 2013), 18 pgs.

\* cited by examiner

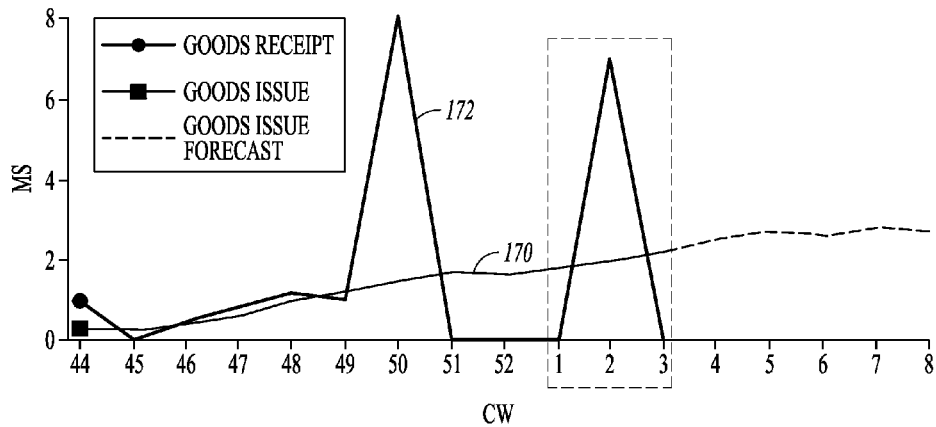

*FIG. 1D*

```
                                                          ┌─180
      1
      2
      3    BEGIN
    ┌ 4        lt_input = select "YearWeek" as ID, sum("GoodIssueLevel_E") as RAWDATA
    │ 5            from "_SYS_BIC" . "temp . aflpoc/MICMATLGRGILEVELQUERY"─182
    │ 6            where "SAPClient" = MAP(:P_SAPClient, null, '004' , ' ' , '004' , :P_SAPClient)
    │ 7                and "Material" = :P_Material
181 ┤ 8                and "ValuationsArea" = :P_ValuationArea
    │ 9                and "Date" > MAP( :P_FromDate, null, '20100101' , :P_FromDate)
    │10                and "Date" > MAP( :P_ToDate, null, '20130101' , :P_ToDate)
    └11            group by "Material" , "YearWeek" order by "YearWeek" ASC;
     12
     13
     14        lt_ctrl = select * from "PAL_POC" . "CONTROL_TAB";─183
     15
     16                           ┌184
     17        CALL "SYS AFL" . "TRIPLESMOOTH TEST" ( :lt_input, :lt_ctrl, lt_out);─185
     18        var_out = select 'GIFC' as APP, "TIME" as PERIOD, "OUTPUT" as VAL from "lt_out;
     19    END       ╲186
     20
```

*FIG. 1E*

IN MEMORY DATABASE WAREHOUSE

BACKGROUND

An in memory database platform is deployable as an on-premise appliance, or as a remote server, sometimes referred to as being in the cloud. It is a platform that's best suited for performing real-time analytics, and developing and deploying real-time applications. At the core of this real-time data platform is an in memory database which is fundamentally different than common database engines where data is stored in slower but cheaper storage devices such as disk drive devices.

Database management systems on the market are typically either good at transactional workloads, or analytical workloads, but not both. When transactional database management systems are used for analytical workloads, they require separating workloads into different databases such as OLAP, Online Analytical Processing and OLTP, Online Transaction Processing. Data from transactional systems have to be transformed for reporting, and loaded into a reporting database. The reporting database still requires significant effort in creating and maintaining tuning structures such as aggregates and indexes to provide even moderate performance.

SUMMARY

An in memory database system includes a random access memory to store an in memory database table, a stored set of defined views over the database table, a stored set of analytical services adapted to provide transaction services and database warehouse services, an engine to run the analytical services on the database table, and an interface to interact with users and provide access to the engine, analytical services, and views to perform transactions and data warehouse functions on the database table.

An in memory data warehouse system executed method includes storing transaction related data in an in memory database table on random access computer readable memory, storing a set of defined views in computer readable memory of the database table, executing transaction services and database warehouse services via the in memory database system, and running analytical services on the database table via the in memory data warehouse system.

A computer readable storage device has instructions for causing an in memory data warehouse system to execute a method. The method includes storing transaction related data in an in memory database table on random access computer readable memory, storing a set of defined views in computer readable memory over the database table, executing transaction services and database warehouse services via the in memory database system, and running analytical services on the database table.

BRIEF DESCRIPTION OF THE DRAWINGS

FIG. 1D is graph illustrating a sales forecast according to an example embodiment.

FIG. 1E is diagram illustrating SQL script to invoke a triple smoothing function according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Due to its hybrid structure for processing transactional workloads and analytical workloads fully in-memory, an in memory database modified with analytic services and views combines the best of both worlds. It is no more necessary to take the time to load data from a transactional database into a separate reporting database, or even build traditional tuning structures to enable reporting. Reporting may be performed as transactions are happening. By consolidating two landscapes (OLAP and OLTP) into a single database, the in memory database may provide a massively lower total cost of operation in addition to increased speed.

A new application programming paradigm enables extreme applications. Since the in memory database data table resides entirely in-memory all the time, additional complex calculations, functions and data-intensive operations can happen on the data directly in the database, without requiring time-consuming and costly movements of data between the database and applications. This simplification and optimization of a data layer is a feature of the in memory database that removes multiple layers of technology and significant human effort to get high speed and lower total cost of ownership.

Figure 1A:
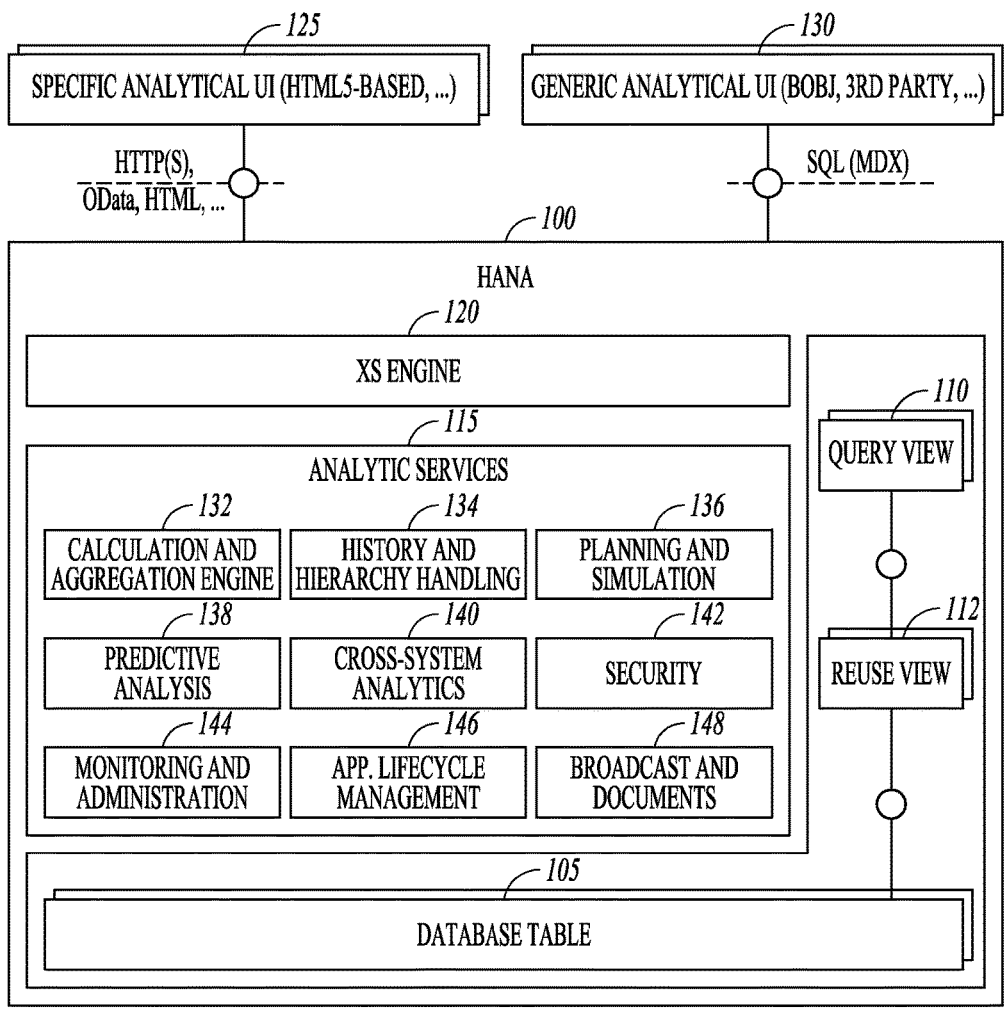
FIG. 1A is a block diagram of an in memory data warehouse according to an example embodiment.
Figure 1B:
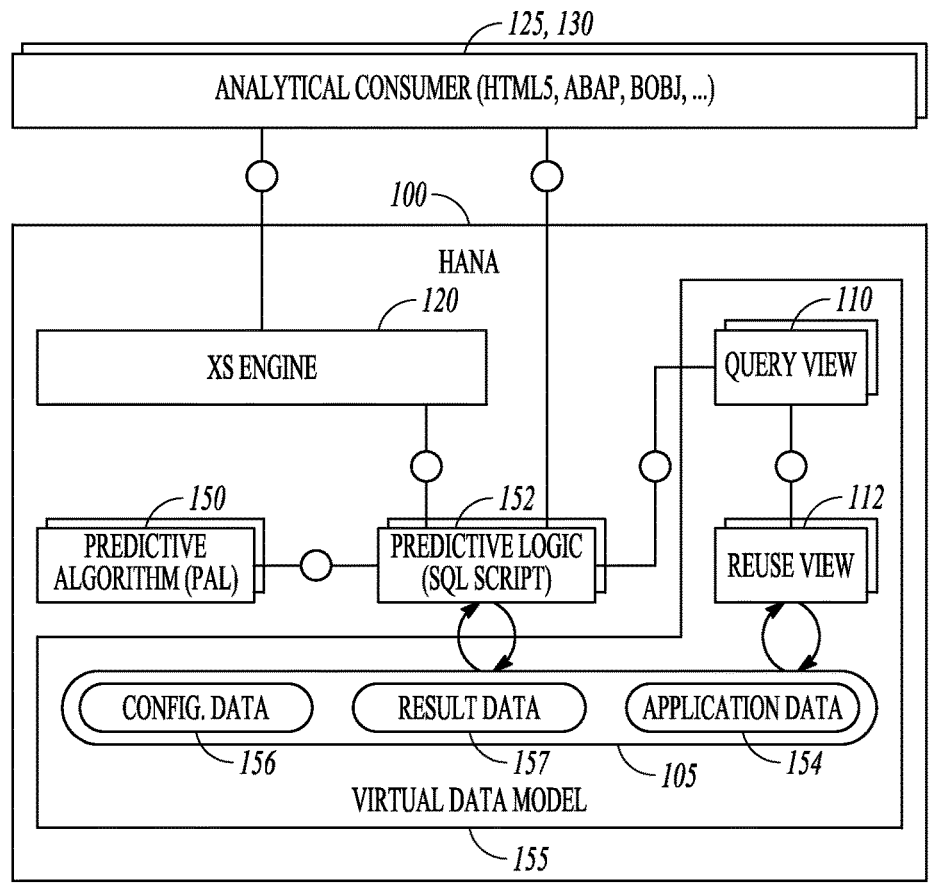
FIG. 1B is a block diagram illustrating integration of predictive analysis functions into an in memory data warehouse according to an example embodiment.

FIG. 1 is a block diagram of an in memory data warehouse system 100 having an in memory database system, which includes a random access memory to store in memory database tables 105; a stored set of defined views, such as query views 110 and reuse views 112, over the database tables 105; a stored set of analytical services 115 adapted to provide transaction services and warehouse services; an engine 120 to run the analytical services on the database table; and an interface, such as a specific analytical user interface 125 and a generic analytical user interface 130, to interact with users and provide access to the engine 120, analytical services 115, and views 110 to perform transactions and data warehouse functions on the database tables 105.

A layered set of database views 110, 112 into the database tables 105 is defined. They describe the virtual data model (VDM). As the top layer of the virtual data model, a collection of so called query views 110 are provided. They have been designed for the direct consumption through generic analytical user interfaces 130 (e.g. BOBJ, 3rd Party) or via OData protocol through specific HTML5 user interfaces. Exposure of the query view via OData-Services, is done via the XS Engine 120. In one embodiment, XS Engine is a SAP HANA component that deals with HTTP(S) requests as one of its application server features.

By evolving an in memory database to an in-memory data warehouse system 100 without the need of an additional business warehouse server and ABAP server, a new paradigm of performance, agility and simplification is established. Query performance and data loading is exponentially faster, so complex reports and analysis that took hours or days can be available in minutes—or even seconds. The costly extraction, transformation and loading processes are no more necessary as business data is already stored in an in memory database server. Thus reporting on real-time data is enabled which is a fundamental improvement. As open standards like SQL are supported, the implementation of data warehouse reports is dramatically simplified. Furthermore the elimination of the ABAP server reduces total cost of ownership as administration effort is decreased and the system landscape is streamlined.

In memory data warehouse system 100 performs as a data warehouse. Abstraction of various business needs regarding analytics results in operational, tactical and strategic uses cases. In various examples, three use cases illustrate main requirements. Analytic services 115 and query views 110, 112 are used to satisfy requirements for the use cases.

Operational use cases support day to day business decisions. Operational reporting is about enabling the business to do their daily work by providing detailed and real-time information on customer's processes. One use case focuses on collecting transactional data in order to enhance operational efficiencies. Operational reporting covers all business processes within a company (e.g. financial, material management, sales or purchase) and is subject to constant additions, updates and deletes.

Operational reports are used by people with responsibility for improving operations. They provide task-oriented line-item information on individual transactions at the very granular level of detail required for operational management. The reports usually relay on data from one business application like a single Enterprise Resource Planning (ERP) deployment which is covering North America financial processes. Reports cover a shorter time frame in comparison to other use cases. Examples: List of open orders, material on stock, education cost in a profit center etc. Operational reports are commonly run on transactional systems as opposed to on a data warehouse type of system, and involves mostly present and short term history.

Tactical reports are run by business professionals with little or no technical experience. The business professionals want to use analytical applications to drill down and through multidimensional objects. They rely on architects to build commonly used data objects for their work. This use case may combine data from multiple operational systems or store attributes that are not resident in the operational system since they are not required for operational processing. The use case includes historical data and structures, prepares and consolidates the data for multidimensional usage. In short, tactical reports may put operational data into a business context for business users. It also may require complex data analysis or even predictive analytics including past trends. Tactical reports are intended for monitoring and responding quickly to a variety of short-term situations and don't have a hard requirement for real time data. The reported data is stable over a certain time frame so that results are consistent across reports from a variety of perspectives for the analysis duration. Examples may include Days Sales Outstanding (DSO), Working Capital Management (WCM), Liquidity forecast etc. While some tactical reports may be run on a transactional system, many involve medium term to long term history, and are more effectively run on a data warehouse type of system.

Strategic reporting mainly serves business management personnel, who demand pre-consolidated and deeper structured and aggregated data as it is already delivered for tactical reporting. Very often there is no need for detailed information except when a root-cause analysis is required. Strategic reporting summarizes and structures business key performance indicators (KPIs) to support strategy decisions. It always includes a historic view and is dealing with longer time periods and combines data throughout the whole company to provide a holistic overview over the company's situation. Strategic reporting focuses on what will happen, and generally rely on historical data to predict the future. As such, they are more effectively run on a data warehouse type of system.

In one embodiment, a defined architecture for the in memory data warehouse 100 is suitable for running all operational, tactical, and strategic reports, and may provide one or more of the following key business objectives and guiding principle listed below.

Reduced total cost of ownership: With in-memory data management concepts, the required analytical capabilities may be directly incorporated into the operational systems. Enterprise systems will become less complex and easier to maintain, resulting in less hardware maintenance and IT resource requirements.

Innovative applications: In-memory data management combines high-volume transactions with analytics in the operational system. Planning, forecasting, pricing optimization, and other processes can be dramatically improved and supported with new applications that were not possible before.

Better and faster decisions: In-memory enterprise systems allow quick and easy access to information that decision makers need, providing them with new ways to look at the business. Simulation, what-if analyses, and planning can be performed interactively on operational data. Relevant information is instantly accessible and the reliance on IT resources is reduced. Collaboration within and across organizations is simplified and fostered. This can lead to a much more dynamic management style where problems can be dealt with as they happen.

Guiding Principles may include the right place for data processing: The more data is processed during a single operation, the closer an operation to be performed should be executed near the database. Processing operations like aggregations should be executed in the database while single record operations should be part of a next layer or layers.

In one embodiment, system 100 may be easily adapted to newer versions and allows incremental addition of new features. Unnecessary generalization may be avoided as in general it decreases performance and worsens consumption.

In a side-by-side deployment model, where an application server utilizing a standard database is used for some if not most transactions and system 100 provides analytics and warehouse functions, the database tables 105 come into system 100 via replication from the application system, for which e.g. SLT (SAP Landscape Transformation) server can be used. For the integrated deployment option as shown in FIG. 1, the database tables 105 may be used directly.

On top of these application database tables, a layered set of database views is defined. They describe the virtual data model. At a top layer of the virtual data model, a collection of so called query views 110 are provided. They have been designed for the direct consumption through generic analytical user interfaces (e.g. BOBJ, 3rd Party) or via OData protocol through specific HTML5 user interfaces. Exposure of the query view via OData-Services, is done via the XS Engine. XS Engine is a SAP HANA component that deals with HTTP(S) requests as one of its application server features.

The building block Analytic Services 115 provides capabilities used for implementing analytical use cases. Supportive services like lifecycle management 146, monitoring and administration 140, and security 142 are provided. Besides core analytic functionalities like calculation and aggregation engine 132 advanced analytic capabilities like hierarchy handling and history management 134, planning and simulation functions 136, predictive analysis 138 and cross-system analytics 140 are provided to implement more sophisticated analytical use cases. These analytic services are explained in the following.

Within system 100 there are several engines represented at 120 that run on processors which ensure that queries and calculations can be handled. A planning engine 136 is provided to run planning functions, a MDX processor for MDX statements, a calculation engine 132 for calculation task on key figures or for the execution of stored procedures and a SQL processor to handle SQL statements. The calculation engine 132 plays a role in the query execution. It not only handles the queries but also all stored procedures and calculation operators to realize the data flow. It serves as a common execution runtime for Calculation Views, SQL SCRIPT, MDX queries and Planning Engine operations. All these can be seen as domain-specific programming models that are translated into a common representation called "calculation model" which is executed on the database. Once the different artifacts are translated into this unified model, they are uniformly processed by the calculation engine 132. The calculation engine 132 may also have a predefined set of operators called Application Function Library (AFL) which can be extended by custom operators.

In one embodiment, historical handling of data is performed at 134. Historical data corresponds to past-period information, usually used for analytics, legal reasons or root cause analysis. In analytics historic data are used to analyze time series of data over a longer time horizon in order to provide for example trending or forecasting. Historical data should be storable and accessible without severely impacting the performance of the system. Consumption of historical data should be simple and based on open standards like SQL. Further detail regarding history handling is provided below.

Hierarchy handing is performed at 134 in one embodiment. Hierarchies are used to structure and define the relationship between attributes. End users want to drill down and view their reports along hierarchies. Almost any business query must process hierarchical data. Frequently, the query contains a time aspect which is composed of the well-known hierarchy of, for example, years, quarters, months, and days. Other examples are regions or countries, organizational units, profit centers, and product groups. Not all of them can be transformed into uniform hierarchies, but may be irregular hierarchies, such as for example, organizational hierarchies that contain different roles on the same layer. The hierarchical structure may be time dependent. Considering an organizational hierarchy example, the monthly sales report of a sales unit should reflect the organizational changes in the unit, for example, employees switching positions. Hierarchies, such as organizational hierarchies, can change frequently, and in many cases a record of these changes is needed for historical snapshot reporting. Exposed models that consist of attributes in hierarchies simplify analytics. Usually at least level (e.g. organizational structures) and parent/child hierarchies (e.g. bill of materials) are required.

Planning and simulation 136 may be performed to address the need to foresee the future of a business. It does not deal with actual business transactions but it predicts the transactions of the future. The basic requirement for business planning is to create plan data either manually or automatically. Planners have to develop the information and understand the objectives of the corporation and the overall business environment to make sure the business plan developed is achievable and will move the company toward a successful result. Plans from different areas are interrelated very much, e.g. a sales plan provides the basis for a production plan. Because of this interrelation the creation of the plans for different areas typically follows a strict schedule in the company. As a consequence, support for steering and monitoring the whole planning process across the different planning areas is needed. Reacting to changes in the context of a business plan requires rapid generation of results, quick re-planning and re-budgeting, coordinated and swift implementation of the new budget across highly complex organizations.

Cross-system analytics 140 may be provided to consolidate, transform and clean data from different data sources and in a consequence provide a central and consistent view for reporting and analyzing data within a company. To provide a holistic overview over the companies' situation, data originating from various source systems have to be harmonized and combined throughout the whole company. When data is replicated from several source system it is very likely that the data doesn't fit together from a business or technical context. A simple example is master data like cost centers. The same cost center key can exist in multiple source systems with different cost centers assigned. When the data is replicated into an in memory database, also operating as an in memory data warehouse, functionality is needed to bring the different data sets together and to create one common data foundation. Besides transformation, the data consistency should be ensured. For example different releases of source systems must be managed, replication dependencies (e.g. master-detail) have to considered or separation of data from different source systems have to be supported. On top of that it's also necessary to monitor the logic and flow of data replicated from various systems, including systems running applications of different vendors. Further detail regarding cross-system analytics is provided below.

Predictive analysis 138, also referred to as predictive analytics, encompasses a variety of statistical techniques and data mining solutions that enable building predictive models and visually interacting with the data to discover hidden insights and relationships in data, and thereby provide the basis for making predictions about future events. Examples for such statistical methods are descriptive models which classify customers or prospects into groups, decision models which predict the results of decisions involving many variables and the predictive model itself which is analyzing historical data to assess how likely a specific behavior is to expect. These models are used to implement several predictive analysis functions.

Forecasting involves answering questions such as "How do historical sales, costs, key performance metrics, and so on, translate to future performance?" "How do predicted results compare with goals?" Key Influencers identify the main influencers of customer satisfaction, customer churn, employee turnover, and so on, that impact success. Trends provide historical/emerging, sudden step changes, unusual numeric values that impact the business. Relationships identify correlations in the data, such as cross-sell and up-sell opportunities. Anomalies might exist and conversely groupings or clusters are identifiable that might exist for specific analysis.

Predictive analytics may involve processing high data volumes. Statistical and data mining algorithms used in such analytics are usually very performance intensive due to the high data volumes. In one embodiment, data is processed in the database, closer to the data, to improve performance. In one embodiment, system 100 is provided with PAL (Predictive Analysis Library), which is an application function library that offers statistical and data mining algorithms. In addition specific algorithms can be implemented if required. As shown block diagram form in FIG. 1B with like reference numbers for like parts in FIG. 1A, statistical and data mining algorithms 150 may be invoked and orchestrated by implementing SQL SCRIPT code 152. Containers for this coding can be scripted views or procedures.

The statistical and data mining algorithms utilize application data 154 as input for the computation. A virtual data model 155 with its query views 110 are used for this purpose. Thus a simple and standard access mechanism is reused. If existing query views are not sufficient to read the required input data, standard SQL techniques can be used to enhance the existing query views or to define new query views. Usually the algorithms also require configuration parameters, e.g. the maximum number of clusters for a clustering algorithm. Those configuration parameters are stored in specific tables as configuration data 156 and encapsulated with query views. Depending on the execution time of the algorithms the results 157 can be provided to the user interface 125, 130 immediately or may be stored in the database as indicated at 157. In the second case again query views may be offered to expose the stored results. The predictive logic and the according control/result data can be triggered from UI directly or using the XS Engine 120 (web server inside system 100, such as SAP HANA). In the second case according OData (output data) services may be provided so that the access with HTTP protocol is supported.

The virtual data model concept is reused for input, control and result data. Therefore all solutions for the typical challenges are inherited, e.g. security, enhancement, performance or access from UI. Thus no new concepts are required but existing concepts are enhanced. This results in simple and powerful solution architecture.

Figure 1C:
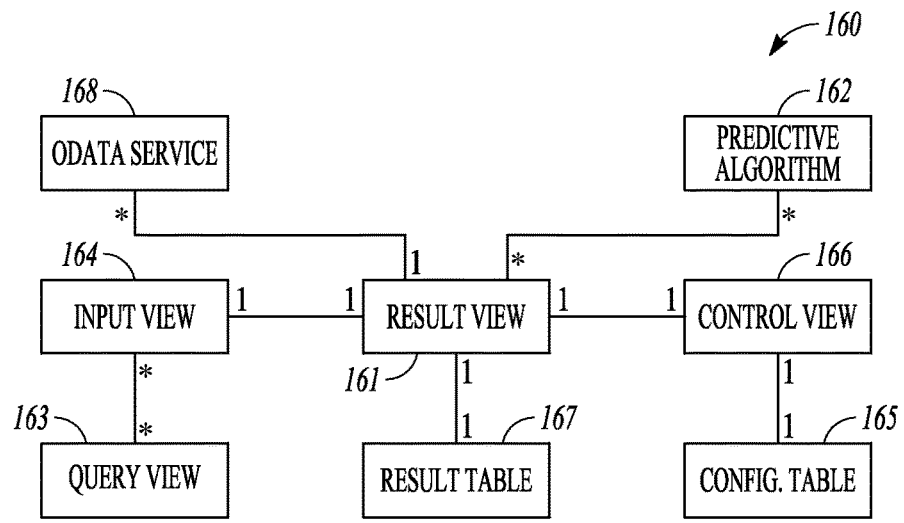
FIG. 1C is block diagram illustrating a metal model for predictive analysis according to an example embodiment.

FIG. 1C illustrates a meta model 160 for the described architecture. One of the main entities is a scripted result view 161 where the orchestration and invocation of the predictive algorithms 162 are implemented. In one embodiment, programming language SQL SCRIPT is used. For an input parameter of the algorithms a query view 163 may be directly utilized or new input views 164 may be defined for this purpose. A control parameter for the algorithms may be stored in tables 165 and exposed with views such as control view 166. The results can be stored in a table 167 or provided to the user interface immediately. To consume the results from UI via HTTP protocol according OData services 168 are offered.

In the following section the above described approach is shown with some example coding. An inventory management use case is chosen to illustrate a prediction for planned goods issue by calendar week for a material. The prediction is a forecast is illustrated in graph form in FIG. 1D, where calendar week CW is illustrated on one axis with millions of dollars shown on the other axis. The forecast is shown as a portion of line 170 extending beyond calendar week three. Goods received is shown at line 172 showing two larger receipts of goods at weeks 50 and two.

As an example statistical algorithm, a triple exponential smoothing is chosen. Much of the coding would look similar for other algorithms. FIG. 1E illustrates example SQL SCRIPT coding at 180 that invokes the triple exponential smoothing function.

As the algorithm expects data in certain format and order, the input data is prepared at lines 4 to 11 as indicated at 181. The query view MICMATLGRGILEVELQUERY is directly called at 182 to read the input data. The control parameters of the algorithm are stored in the database and read into the variable lt_ctrl (line 14 at 183). The triple exponential smoothing algorithm is called at 184 with the input and control parameters. It returns the results in the variable lt_out (line 17 at 185). Those results are assigned to the view's output structure var_out at 186. Thus the results can also be accessed by using standard SQL.

To invoke the above defined scripted view by an HTML5 UI using HTTP protocol an OData service can be defined as following:

```
service {
    "tmp.aflpoc::GIFORECASTCP" as "GOODSFORECASTCP" keys
generate local "GenID" parameters via entity "GIFCCPQuery";
}
```

In the following, some rules of thumb are outlined when implementing applications with predictive analytics capabilities. It is not claimed that this list of recommendations are complete.

Statistical and data mining algorithms should be processed in the database. In predictive analytics often high data volumes are processed. Therefore the according statistical and data mining algorithms are usually very performance intensive.

Predictive Analysis Library (PAL) should be used. Background: SAP HANA provides with PAL an application function library that offers statistical and data mining algorithms. Those algorithms may be implemented in C++, are executed in the database kernel and therefore optimized for high performance.

If PAL does not provides the required statistical and data mining method, custom algorithms may be implemented using the application function library (AFL) approach. With the AFL approach algorithms can be implemented in C++ and executed in the database kernel. Thus high processing performance is achieved.

Predictive logic, namely the invocation and orchestration of the statistical and data mining algorithms, may be implemented in SQL SCRIPT.

Scripted calculation views may be used for the implementation of the predictive logic, if the computed results must not be persisted.

Procedures may be used for the implementation of the predictive logic, if the computed results must be persisted. Query view shall be provided for the stored results. A write operation is only supported by procedures in some embodiments.

For the input data of the algorithms existing query views may be utilized. If this is not sufficient new query views may be defined.

Control parameters for the algorithms may be stored. Query view may be provided for the stored control parameters.

For the result data and control parameter separate OData services may be provided.

The purpose of predictive analytics is to encompass a variety of statistical techniques and data mining solutions that enable building predictive models and visual interaction with the data to discover hidden insights and relationships in data, and thereby provide the basis for making predictions about future events. Examples for such statistical methods are descriptive models which classify customers or prospects into groups, decision models which predict the results of decisions involving many variables and the predictive model itself which is analyzing historical data to assess how likely a specific behavior is to expect. These models are used to implement forecasting, key influencers, trends, relationships or anomalies.

The virtual data model concept is reused for input, control and result data. Therefore all solutions for the typical challenges are inherited, e.g. security, enhancement, performance or access from UI. Thus no new concepts are required but existing concepts are enhanced. This results in a simple and powerful solution architecture.

By evolving an in memory database system to an in-memory data warehouse without the need of an additional business warehouse respectively, system 100 provides a new paradigm of performance, agility and simplification. Query performance and data loading is exponentially faster, so complex reports and analysis that took hours or days can be available in minutes—or even seconds. The costly extraction, transformation and loading processes are no more necessary as the business data is already stored in an in memory database. Thus reporting on real-time data is enabled which is a fundamental improvement. As open standards like SQL are supported the implementation for data warehouse reports is dramatically simplified. Furthermore the elimination of a separate ABAP server reduces total cost of ownership as administration effort is decreased and the system landscape is streamlined.

Handling of predictive analytics is one of the core capabilities of an in-memory data warehouse. This feature allows companies to uncover hidden customer, product, service, employee, vendor or partner trends and insights. They can anticipate behavior and take proactive action. Companies can empower their team with intelligent next steps to exceed customer expectations. They can create new offers to increase market share and profitability. Corporations can develop and execute a customer-centric strategy. They can target the right offers to the right customers through the best channels at the most opportune time.

The in memory database warehouse 100 provides an environment where customers can build models directly in the database to run analysis on historical transactional data. Broadcast and documents module 140 makes reports available to a wide spectrum of users, according to their requirements. Analytic results may be distributed by mail as pre-calculated documents or as links. The recipients receive (for example, automatically upon data change) the pre-calculated documents in their inboxes and can use the business data to make decisions or trigger processes. Those analytic results can also be published to a portal, which serves as the central entry point for employees in the company. Another method is to publish a query by according link. The distribution can be scheduled periodically (e.g. every month or each quarter) or be based on events (e.g. new sales data available or unusual sales figures).

Security module 142 involves various security aspects. In one embodiment, the following dimensions may be addressed:

Authentication is the process of determining whether someone or something is, in fact, who or what it is declared to be (Who are you? Can you prove it?) For connecting to the database, the in memory database warehouse 100 supports external and internal authentication. External authentication is using standard authentication protocols like Kerberos or SAML. Kerberos is a standardized service for authentication in networks. The client connects to the Kerberos server to authenticate the user and to get an authentication ticket that proves the user's identity to the SAP HANA database. With internal authentication, users are authenticated by the SAP HANA database using the database username and password.

Authorization is the process of giving someone permission ("to allow") to do or have something but also checking of the permission values when a user is getting access (Which permissions shall be given? What are you allowed to do?)

System privileges are used in the in memory database warehouse to perform system level operations or administrative tasks such as creating and deleting database schemas, managing users and roles, administration of monitoring and tracing, performing backup and restore operations, and so on. Object privileges allow performing specified actions on specified database objects. It is mandatory to not only create users and roles and to grant rights to access data objects and functions it is also essential to grant rights to specific data values. For example User A is authorized to access customer A while userBis authorized to only access customer B.

Confidentiality is a set of rules or a promise that limits access or places restrictions on certain types of information (Who is able to read this message?)

Secure storage is one aspect that has to be ensured regarding confidentiality. Sensitive data (e.g. credit card numbers) should be stored in encrypted form. For that according en- and decryption mechanism are required. Data encryption may be provided by respective operating system or storage provider in some embodiments, or may be integrated into system 100 in further embodiments.

Auditing is the process to verify, independently, the quality and integrity of the work that has been undertaken within a particular area, with reference to legally accepted procedures (Which user changed data? What legal requirements have to be fulfilled?)

Auditing may provide for traceability of actions performed in the system 100. Security logging and tracing may be supported using operating system log files. Audit policies and trails may be specified based on those data. Audit policies define which events to audit. Each policy has a name and can be enabled or disabled by an administrator having the according privilege. Audit policies are not dropped when the creating user is removed. The policy has several further attributes, which are used to narrow the number of events that are audited.

Data privacy and protection may also be provided. Personal data should be deleted if there is no purpose to keep it. Deletion should not destroy referential integrity between objects and have to consider all defined retention periods. Read logging for sensible data may also be ensured.

Application Lifecycle Management 146 covers capabilities to support the lifecycle of system 100 based applications. It's about functionality to move configuration changes between different database warehouse instances to keep productive systems in sync with quality or development systems. Lifecycle management may also be used for updating the database warehouse by applying new revisions levels or support packages. If new revisions or versions are implemented the system needs to be able to identify which views were extended by the customer and ask which version to keep in the future. Aspects of design time tools, supportability, maintainability or archiving are also considered in the context of application lifecycle management. Customers should be able to use a consistent set of tools for working with the in memory database warehouse. The tools should eliminate all significant hurdles for the adoptions of content and thereby help to reduce total cost of operation for customers. Specific tool support is especially required for identification of relevant database views, extensibility, consistency checks or field name catalog.

Administration and monitoring may be provided at 144. For operational usage monitoring, tracing and troubleshooting capabilities have to be provided. For example the administrator has to be informed regarding critical situations and according solutions by an alert framework. For monitoring query performance statistics and visualization tools are mandatory. These administrating and monitoring tasks in one embodiment cover all schemas and tables in the database. A statistics server is a framework for monitoring and pro-active alerting that provides the following:

Polls important system parameters in regular intervals.
Performs checks based on customizable thresholds.
Alerts displayed to users.
E-mail alerting.
Integration with central life cycle management tools like SAP Solution Manager.

Figure 2:
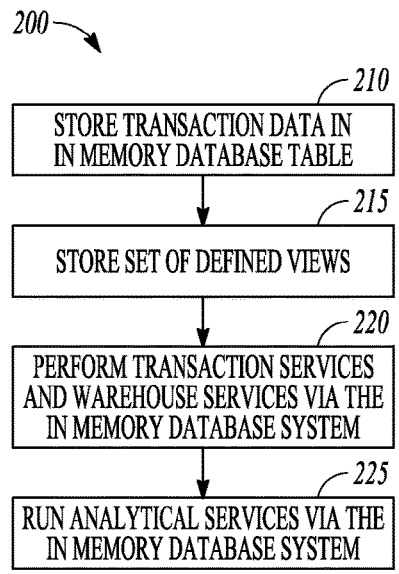
FIG. 2 is a flowchart illustrating a method of using an in memory data ware house system to perform transaction and warehouse functions according to an example embodiment.

Traditional database management systems are designed for optimizing performance on hardware with constrained main memory. Disk I/O is the main bottleneck. In one embodiment, the system may be designed from the ground up around the idea of in-memory processing and column-based storage option. System 100 combines transactional and analytical processing. FIG. 2 is a method 200 of using system 100 to perform transaction and warehouse functions according to an example embodiment. At 210, system 100 stores transaction related data in the in memory database table on random access computer readable memory. At 215, a set of defined views is stored in computer readable memory over the database table. At 220, the system performs transaction services and database warehouse services via the in memory database system. At 225, analytical services are run on the database table via the in memory database system.

In some embodiments, an interface is provided to interact with users and provide access to the engine, analytical services, and views to perform transactions and data warehouse functions on the database table. The user interface may include a specific analytical user interface utilizing HTML, and a generic analytical user interface utilizing SQL. The defined views may include query views and reuse views. The analytical services in some embodiments include a calculation and aggregation engine. In further embodiments, the analytical services include a predictive analysis services, a history and hierarchy handling services, cross system analytics services, security services, and planning and simulation services.

Further detail is now provided regarding managing and providing access to historical data. In an optional side-by-side deployment model, the database tables 105 come into system 100 via replication from application systems, for which an SLT (SAP Landscape Transformation) server or other server may be used. For the integrated deployment option, the database tables of the application are used directly.

Historical data are past-periods information, usually used for analytics, legal reasons or root cause analysis. In analytics, historic data are used to analyze time series of data over a longer time horizon in order to provide for example trending or forecasting. Historical data must be storable and accessible in system 100 without severely impacting the performance of the system. Consumption of historical data should be simple and based on open standards like SQL.

In context of analytics at least three challenges are to be considered. First, not all application data are time-dependent, thus not for all records validity periods or timestamps are maintained and stored in the database. Second, keeping history for application data for which today no time-dependent data is maintained increases the demand for additional hardware and performance requirements. Third, customers usually archive data on a regular base to avoid performance gaps and save hardware costs. Archiving results in deletion of data from operational systems and moving them to an archive store.

Time dependent data having a validity period may be stored with maintained validity periods in one proposal. Usually transactional data in applications contain validity periods or timestamps. This is also true for various master data, e.g. all business objects in a Human Capital Management application are stored with validity periods in the database. In case of time-dependent data usually all updates on the records result in adjusting of the validity periods. For this category of time-dependent data according views could be provided exposing the history. Consumers of those views would be enabled to time travel and retrieve data that was valid at a certain point in time by filtering the data based on the valid from and valid to information.

Time dependent data without validity periods may be stored without maintained validity periods in another proposal. Application data exits that is relevant for analytics in terms of time travel queries. However for those data the according time-dependent aspects are not available in the operational database. One solution for facing this issue is the identification of the relevant tables and enhancement of those with regard to time-dependency. Such a solution however, is probably a costly and disruptive approach that might not be accepted by customers.

Another proposed solution that might work in some cases is to consider the change documents or logs for the according business objects resp. processes and to derive time-dependent information out of that. Again views could be defined based on those data in order to expose also historical aspects. However the usage of such an approach is very limited because logs and changes documents cannot always be presumed.

Figure 3:
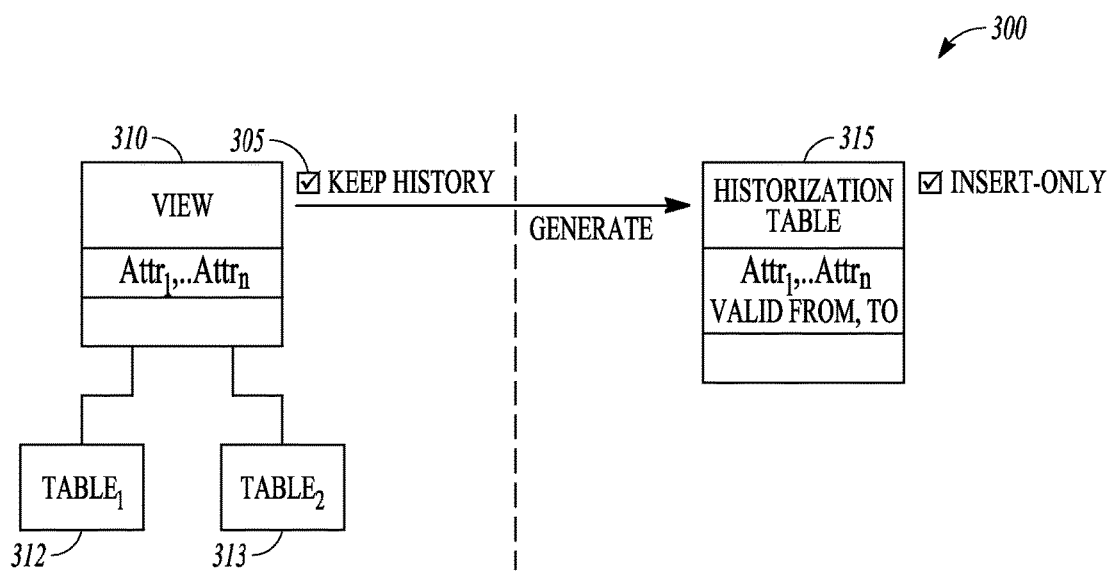
FIG. 3 is a block diagram of a history tracking mechanism according to an example embodiment.

A solution that closes the gaps of the above proposals is to use a virtual data model layer in order to enrich application data with time-dependent information. FIG. 3 is a block diagram illustrating a mechanism 300 for keeping track of historical data. A flag, keep history 305, is provided as an additional property for virtual data management (VDM) views 310 based on one or more tables 312, 313. Activation of the flag 305 would result in generation of a shadow table 315 with the same structure as the according VDM view 310. Shadow table 315 may also be referred to as a history or historization table. In order to keep history information the shadow table 315 should be flagged insert-only.

Figure 4:
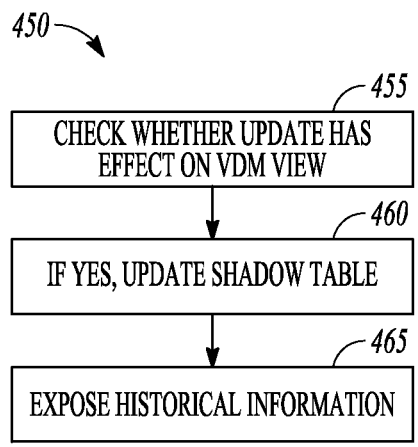
FIG. 4 is a flowchart illustrating a method of updating a shadow table according to an example embodiment.

FIG. 4 is a flow diagram illustrating a method 450 of updating of the shadow table when tables are updated. Whenever the tables 312, 313 are updated which the VDM view 310 is based on, it is checked at 455 whether the update has an effect on the VDM view 310 (e.g. additional values for an attribute of the VDM view 310). If this is the case then the shadow table 315 of the VDM view 310 is updated accordingly at 460. The historical information could be exposed by enhancing the original VDM view or by providing new VDM views at 465.

In principle, there are two ways to implement the insert-only regarding the shadow table 315 with the history data: point representation, which stores only the delta of the new tuple to the old one with a single timestamp, and interval representation, which stores the full tuple including additional information that is used to determine the time span of its validity. Point representation is best suited for online transaction processing (OLTP) applications, since the critical operation is the insertion of new or changed data tuples. The insert operation must be performed quickly while the need for further post-processing of inserted data is eliminated. The main drawback of this method is the requirement to touch and aggregate all older versions of the data to reconstruct the valid version for a specific time. This becomes more expensive if there are a lot of changes within the data. The interval representation is best suited for applications where reading is the most dominant data access pattern, which is commonly found in online analytical processing (OLAP) applications. To achieve the best possible performance it is reasonable to retrieve the desired value by the read operation directly, that is, without the need for any preprocessing using the concept of interval representation.

Updating the history table 315 will cost system resources and performance due to handling of deltas and write operations. In one embodiment, the in memory data warehouse system 100 is optimized for read operations as this is dominant in analytics. One concept to achieve that is compressing of data. Unfortunately, compression induces the problem that changes on a compressed structure are prohibitively slow, because much more data than actually manipulated must be de- and recompressed. To address this issue, every relation stored in a column-oriented layout is associated with an additional write-optimized insert-only structure called a differential buffer such as in the history table 315. All inserts, updates, and delete operations are performed on the differential buffer. The read-optimized main part of the data, called the main store, is not touched by any data modifying operation. The differential buffer grows with every write operation. To compensate this effect, the differential buffer and the main store are merged from time to time within a merge process. This merge process may also be used to write the history table as all relevant information regarding updates and deltas are available.

The merge process allows keeping the history for analytics without disruption of applications existing data models. The flag Keep history 305 is only set if history data is required for a specific scenario. Thus a controlled historization is supported and the volume of created history data regulated. Historization views may be also used to extract history data from system 100 to other data warehouses. Conversely historical data can be imported from other data warehouses by replication of the according tables and providing views on top of them. Besides the handling of historical data this approach of historization views is also helpful to improve performance as the history tables 315 store the calculated results of the views and can be accessed directly without addition calculations.

In one embodiment, analytics may be provided independent of an archiving strategy in source systems. As already mentioned customers archive data on a regular basis in order to free operational systems from load. The demand for archiving even increases when history data are stored in operational systems.

Data can be divided into active and passive category. Active data is defined as data that is in use by one or more business processes and therefore likely to be updated or read in the future. This, for example, includes open invoices or recently closed invoices that are subject to operational reporting or shown in a dashboard. In contrast, passive data is defined as data that is not used by any business process and is not updated or commonly read any more. Statistical analysis on database level regarding access of data can help in active and passive categorization. In addition application specifics could be used for the categorization.

Passive data can be stored on less expensive hardware that nevertheless provides high performance especially for sequential read operations. These sequential reads may be used for analytical applications such as planning or simulation that utilize historical data. As a result, operational systems are released from load while still analytical queries on large amounts of passive and active data are supported. Another advantage is that archiving could also be processed based on passive data. Only passive data would be relevant for archiving. The classical archiving approach where applications have to implement complex archiving objects may be no more needed.

Figure 5:
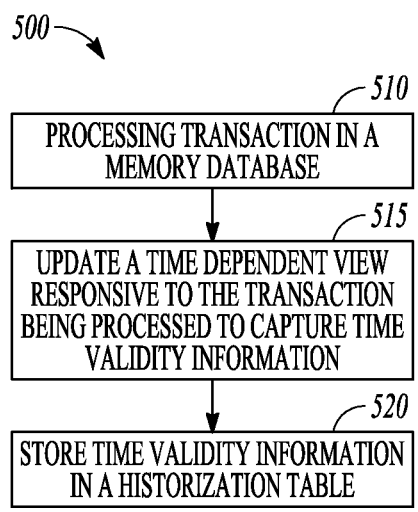
FIG. 5 is a flowchart illustrating a method 500 of providing historical access to time dependent data.

FIG. 5 is a flowchart illustrating a method 500 of providing historical access to time dependent data. The method 500 includes processing a transaction on an in memory database at 510 where data being processed has a validity time. At 515, a time dependent data view is updated responsive to the transaction being processed to capture time validity information regarding the data. At 520, the time validity information is stored in a historization table to provide historical access to past time dependent data following expiration of the validity time.

In one embodiment, a history flag may be checked to determine whether to store the time validity information in the historization table. The historization table is an insert only table in a further embodiment.

The time validity information may include from—to information regarding the data, where such information indicates that the corresponding data is valid for the dates from a first date to a second date. Storing the time validity information may include storing a delta of a tuple with a single timestamp, or storing a full tuple including additional information useable to determine a time span of its validity.

The method may also include associating every relation stored in a column-oriented layout with an additional write-optimized insert-only differential buffer. Inserts, updates, and delete operations may be performed on the differential buffer. In further embodiments, a merge process may be performed on the differential buffer and a main store that stores the data. Data warehouse functions may also be provided against the transaction data.

Handling of historical data is one of the core capabilities of in-memory data warehouse system 100. This feature allows one to time travel and retrieve data at a certain point in time. Thus advanced analytics use cases like tactical and strategic reporting can be implemented.

Figure 6:
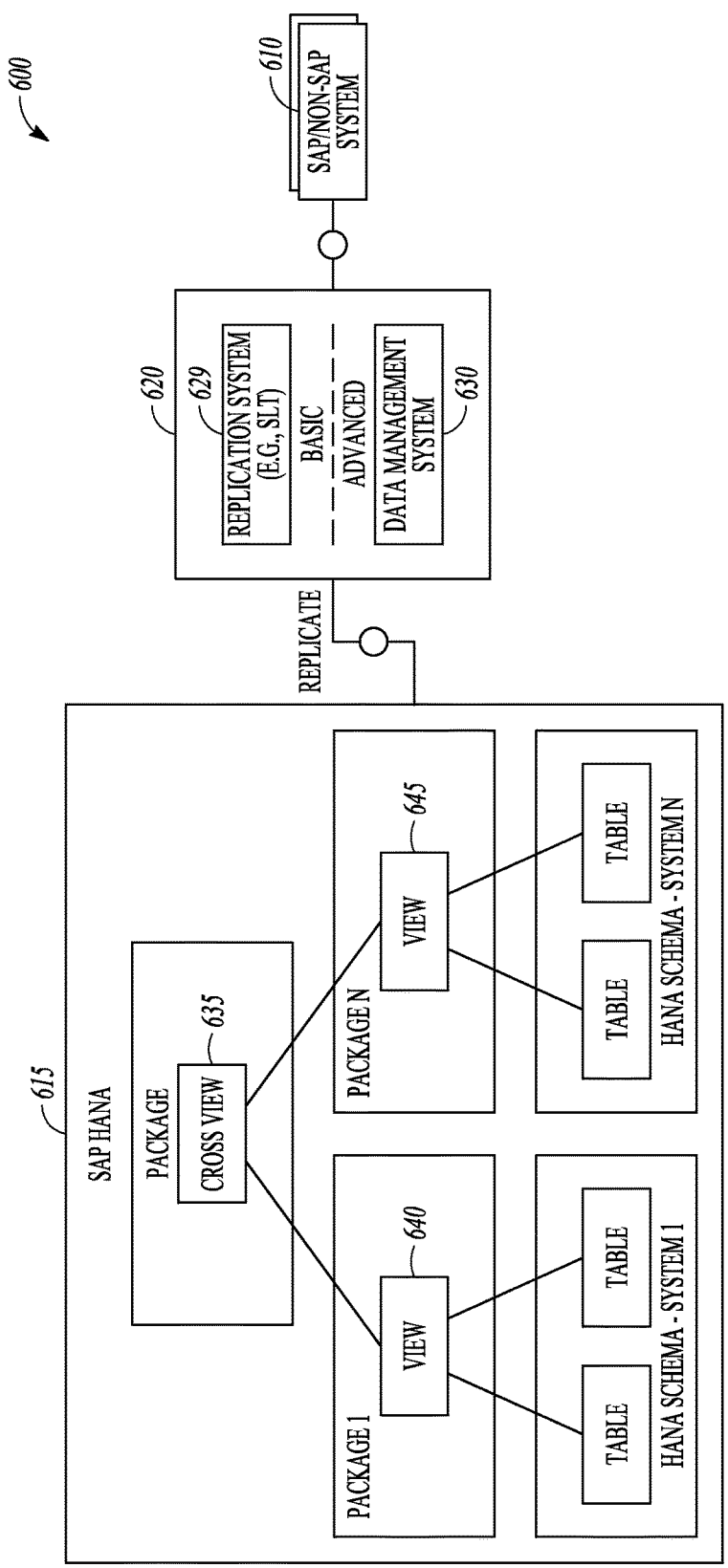
FIG. 6 is block diagram illustrating a cross system analytics system according to an example embodiment.

In one embodiment, cross system analytics are supported as shown in block diagram form at 600 in FIG. 6. The purpose of cross-system analytics is to consolidate, transform and clean data from different data sources 610 and in a consequence provide a central and consistent view for reporting and analyzing data within a company at in memory database warehouse 615. To provide a holistic overview over the company's situation, data originating from various source systems 610 are harmonized and combined throughout the whole company.

When data is replicated via a replication system 620 from several source systems 610 it is very likely that the data doesn't fit together from a business or technical context. A simple example is master data like cost centers. The same cost center key can exist in multiple source systems with different cost centers assigned. When the data is replicated into system 615, functionality is provided to bring the different data sets together and to create one common data foundation. Besides transformation, the data consistency must be ensured. For example different releases of source systems may be managed, replication dependencies (e.g. master-detail) are considered, or separation of data from different source systems are supported. In addition, logic and flow of data replicated from various systems and applications is monitored.

The implementation of cross-system analytics depends on specific scenario requirements. If the relevant source systems 610 share a common implementation template, for example a customer is running an Enterprise Resource Planning (ERP) in each of its regions like America, Europe and Asia and all these systems are based on the same configuration, processes and data structures, then basic infrastructure 625 may be utilized. In case of non-harmonized data, advanced infrastructure 630 may be used.

The purpose of cross-system analytics is to consolidate, transform and clean data from different data sources 610 and in a consequence provide a central and consistent view 635 for reporting and analyzing data from tables in multiple systems with views 640, 645 within a company. To provide a holistic overview over the company's situation, data originating from various source systems 610 are harmonized and combined at 620 throughout the whole company. A simple example is master data like cost centers. The same cost center key can exist in multiple source systems with different cost centers assigned. When the data is replicated at 620 into system 615, functionality is needed to bring the different data sets together and to create one common data foundation to handle cross-system analytics.

Basic cross-system analytic scenarios may utilize database views having built-in functionality for transformation and enrichment of data. SQL SCRIPT can be used in order to implement complex mapping and harmonization logic. With VDM further concepts like currency or unit conversion are added. Replication servers 625, such as SAP SLT or SAP Sybase Replication Servers support replication of data from multiple source systems.

In one embodiment, a replication server is realized with log-based replication to system 100. The replication server captures table changes from low-level database log files and transforms them into SQL statements that are in turn executed on the system 100. This is very similar to what is known as log shipping between two database instances. Replication with the replication server is very fast and consumes little processing power due to its closeness to the database system. However, this mode of operation makes this replication method highly database dependent, and the source database system coverage is limited. It also limits the conversion capabilities, and so replication with Sybase Replication Server only supports unicode source databases. The Sybase Replication Server cannot convert between code pages, and because in one embodiment, system 600 is SAP HANA based and works with unicode encoding internally, the source database has to use unicode encoding as well. Also, certain table types used in SAP systems are not supported.

SAP Landscape Transformation (SLT) Replication used in one embodiment is also based on tracking database changes, but on a much higher level. The efficient initialization of data replication is based on database triggers and a delta logging concept. It allows real-time or scheduled data replication of the tables that are chosen. Because it is operating on the application level, the trigger-based replication method benefits from the database abstraction provided by the SAP software stack, which makes it database independent. It also has extended source system release coverage, supporting releases starting from SAP R/3 4.6C up to the newest SAP ERP version. SAP SLT Replication leverages proven System Landscape Optimization technologies (such as Near Zero Downtime, Test Data Migration Server, and SAP LT) and can handle both unicode and non-unicode source databases. SAP SLT provides a flexible and reliable replication process, fully integrates with SAP HANA Studio, and is simple and fast to set up. SAP SLT does not have to be a separate SAP system. It can run on any SAP system with the SAP NetWeaver 7.02 ABAP stack (Kernel 7.20EXT). However, it is recommended installing the SAP SLT on a separate system when high replication load would impact the performance of the base system. SAP SLT is the ideal solution for real-time (or scheduled) data replication sourcing from SAP systems into SAP HANA and should be considered for the basic cross-system analytics.

With the same mentioned concepts also data from non-SAP systems could be integrated into cross-system analytics, assuming that the requirements are also basic.

Advanced cross-system scenarios may need features like de-duplication, key mapping or staging as for example the involved systems are heterogonous in terms of data models or processes. In this case the solution proposal is to harmonize the data before they are replicated into SAP HANA. For this task special data management system 630 solution like SAP Business Objects Data Services or SAP MDM with rich and mature functionality exist. Such data management systems provide capabilities listed in the table below.

Duplicate check enables the identification and prevention of duplicate records as well as the consistency of records in different systems that describe identical business object instances.

Mappings are used to distribute data across systems. The concept includes structural mapping, value mapping, ID (or key) mapping.

Validation ensures data quality. This includes local and central validations at different levels which can be extended by customers. Data quality analysis is part of the validation.

Conflict resolution is used to avoid conflicts for data updates by design and how to resolve such situations. It includes forward error recovery at the receiving side and data ownership.

A distribution model is the logical routing model for data. It can be mapped to a publish/subscribe pattern.

Communications and message patters are used In almost all scenarios, data have to be technically transferred from one system to another. Standard communication technologies like web services are used. The structure of the message types are usually derived from the corresponding business object model.

Staging Includes storing inconsistent, inactive, time-dependent versions of business objects and applying business logic to them. This includes message staging which is a prerequisite for conflict detection and resolution.

Data object and persistency model includes the basic services for storing data objects. Is usually generated from the business object model. Delta management determines which data needs to be distributed when. Routing Includes infrastructure to distribute data based on the "publish and subscribe" distribution model.

Model storage contains the business object model, basic validations and ownership by systems. A workflow engine executes workflow processes definitions and in doing so notifies users to carry out certain tasks, like approval of created new data records. Workflow process definitions describe how data is processed in several steps, which may be carried out by different roles or users.

In the advance cross-system scenarios also an arbitrary data warehouse system could be used as pre-processor that replicates harmonized data into system 615.

Depending on the source systems constellations (e.g. harmonized or heterogenic) the basic and advance approach can be of course combined. For basic and advanced cross-system scenarios at least the following challenges have to be solved:

The separation of data from different source systems is needed for transparency reasons and for error handling. Particularly this is required because applications table fields are not used uniformly by our customers. For example the same tables can be enhanced differently in the source systems. Therefore several source system of the same type (e.g. SAP ERP) cannot be replicated into one SAP HANA schema.

The separation of data from different source systems should be achieved by providing different schemas for each source system. Systems can contain several clients. Usually data of all clients of a system are replicated to one in memory database schema. The database tables of this in memory database schema and the views defined for analytics include a client field. When views are consumed, how can it be decided which client is relevant? This question arises even if the landscape consists of only one system. The challenge gets worse in case of cross-system analytics where several systems and so even more clients are involved. In addition, systems without client information could be also part of cross-system analytic scenarios.

Figure 7:
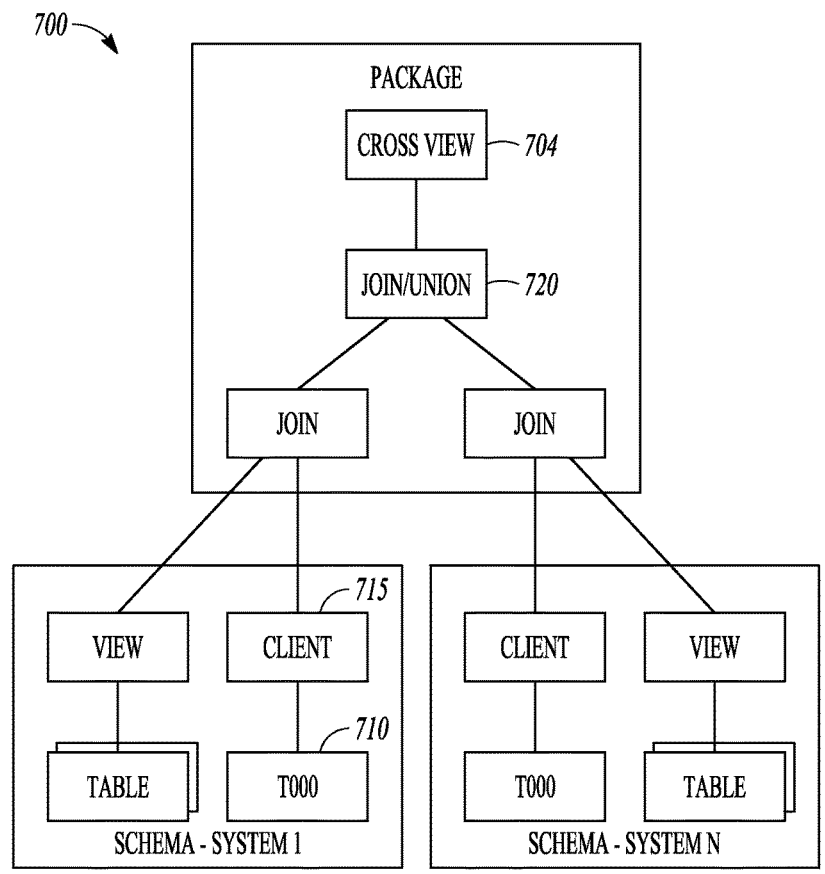
FIG. 7 is a block diagram illustrating a logical system according to an example embodiment.

FIG. 7 is a block diagram of a logical system 700 in one embodiment. Cross-system views 705 expose the logical system for the involved systems. The logical system represents the client and the system instance as a concatenated identifier. In some systems the logical system is stored in the table T000 710 for which the view Client 715 is provided. To enrich the cross-system view 705 with the logical system, according SQL join operation 720 is used.

As mentioned each logical system 700 refers exactly to one client. In order to restrict a cross-system view to the relevant clients of the involved systems, customers may define authorizations based on the attribute logical system. An authorization like "LogicalSystem=ERP100 AND CRM200" would for example allow only combining an ERP system with client ERP100 and a CRM system with client CRM200.

If a system involved in a cross-system view has no stored data regarding the logical system (e.g. in case of non-SAP systems), then a calculated attribute with a default value can be used for this purpose.

If for a cross-system view different users need other combination of logical systems, additional authorizations may be provided and assigned to the users. If for a cross-system view the same user needs several combinations of logical systems, the cross-system view has to be copied and authorizations for each combination of logical systems has to be provided.

The different source systems (e.g. SAP ERPs) that are replicated into system 700 may contain different records with the same key (e.g. ERP 1-CustomerA-1000 and ERP2-CustomerB-1000). Reporting on cross-views that union the records of the involved systems can result in incorrect values (e.g. aggregation of values with key 1000). To solve this issue the records must be differentiable.

A logical system attribute represents each source system and should be used to differentiate those records.

There are cross-system analytics scenarios where the number of the involved systems of same type is already known during design time (e.g. exactly one SAP ERP and one SAP CRM are relevant). Other scenarios exist where the role of the involved systems is known in advance but not the number as this depends on specific customer system landscapes.

Where there are an unknown number of involved systems, cross-system views should be defined for minimum number of involved systems respectively the most likely use case as template. According to the extensibility concept customers can enhance such cross-views so that the concrete system landscape is considered. Generation of cross-system views depending on the specific number of involved systems at customer side would be an even more comfortable solution. However the result would be the same as the mentioned manual extension.

Among others the invention describes how for basic and advanced cross-system scenarios challenges like "Separation of data", "Client handling", "Differentiation of records" or "Unknown number of involved systems" are solved.

By evolving an in memory database into an in-memory data warehouse without the need of an additional business warehouse sever or additional ABAP server a new paradigm of performance, agility and simplification is established. Query performance and data loading is exponentially faster, so complex reports and analysis that took hours or days can be available in minutes—or even seconds. The costly extraction, transformation and loading processes are no more necessary as the business data is already stored in the in memory data warehouse. Thus reporting on real-time data is enabled which is a fundamental improvement. As open standards like SQL are supported the implementation of for data warehouse reports is dramatically simplified. Furthermore the elimination of the SAP ABAP server reduces total cost of ownership as administration effort is decreased and the system landscape is streamlined.

Figure 8:
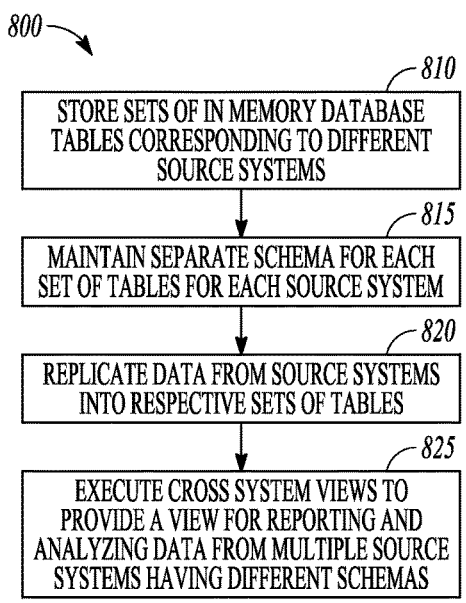
FIG. 8 is a flowchart illustrating a method of performing cross system analytics according to an example embodiment.

FIG. 8 is a flowchart illustrating a method 800 of performing cross system analytics according to an example embodiment. Method 800 includes storing sets of in memory database tables in random access memory of an in memory database system at 810. Each set of tables corresponds to data from a different source system to provide separation of data from each source system. At 815, a separate in memory database schema is maintained for each set of tables corresponding to each source system. Data is replicated at 820 from the source systems into the sets of in memory database tables. At 825, cross system views of data in the sets of tables are executed to provide a cross system central and consistent view for reporting and analyzing data for an organization having multiple systems with different database schemas.

In some embodiments, replicating data includes using a base replication server to replicate data based on database triggers and delta logging. In further embodiments, replicating data includes using an advanced data management replication server to harmonize data prior to replication into the sets of in memory database tables. The advanced data management replication server may perform a duplicate check to enable identification and prevention of duplicate records. The advanced data management replication server may also include structural mapping, value mapping, and key mapping, and further includes a distribution model and routing infrastructure to distribute data based on the distribution model.

In further embodiments, the cross system views expose a logical system for each source system, the logical system including attributes defining authorizations. The cross system views may be formed by union functions to join views and logical system representations from multiple source systems to create the cross system view with authorizations.

Handling of cross-system analytics is one of the core capabilities of an in-memory data warehouse. This feature allows consolidating, transforming and cleansing data from different data sources and in a consequence provide a central and consistent view for reporting and analyzing data within a company. Thus advanced analytics use cases like tactical and strategic reporting can be implemented. In various embodiments, cross-system analytics are handled in the context of an in-memory data warehouse.

Figure 9:
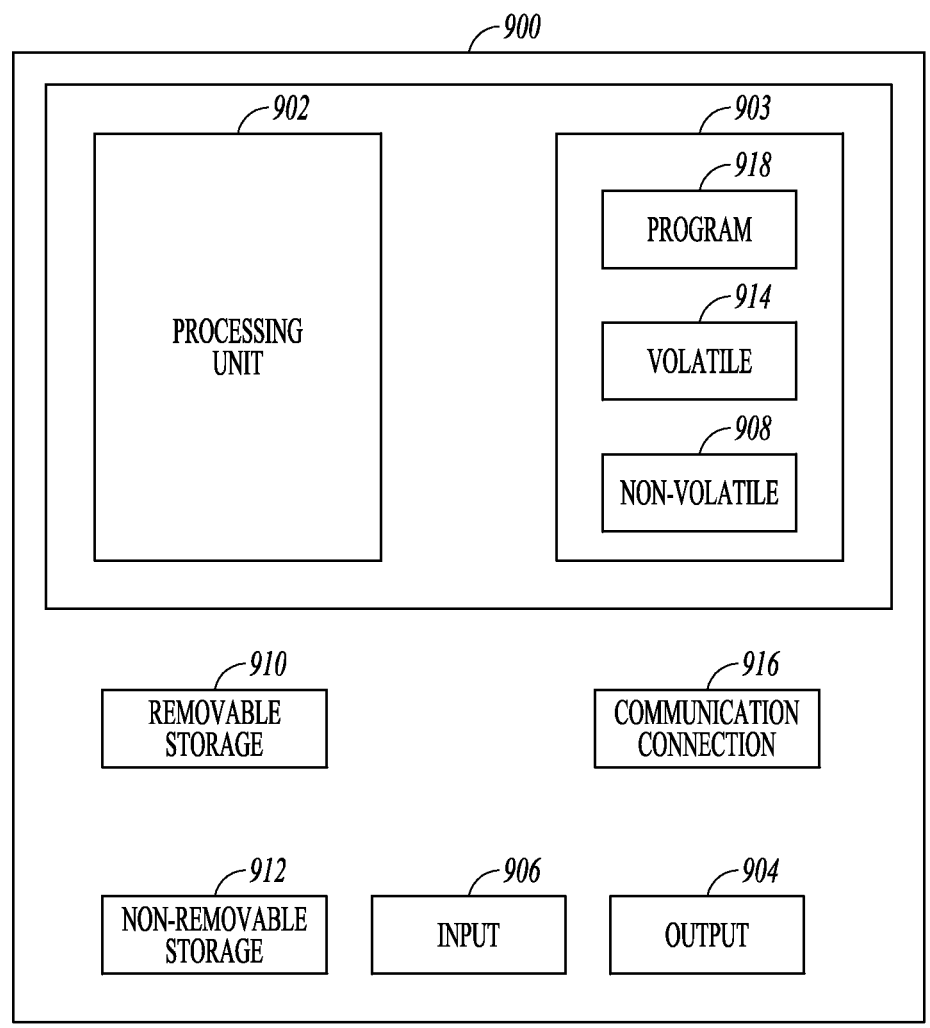
FIG. 9 is a block diagram of a computer system for implementing one or more system according to an example embodiment.

FIG. 9 is a block schematic diagram of a computer system 900 to implement a controller according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 900 may include a processing unit 902, memory 903, removable storage 910, and non-removable storage 912. Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 900 may include or have access to a computing environment that includes input 906, output 904, and a communication connection 916. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 900. A hard drive, CD-ROM, and RAM are some examples of articles including a non-transitory computer-readable medium. For example, a computer program 918 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers.

EXAMPLES

1. An in memory data warehouse system comprising:
a random access memory to store and manage in memory database tables;
a stored set of defined views of the database tables;
a stored set of analytical services adapted to provide transaction services and database warehouse services; and
an engine to run the analytical services on the database table.

2. The in memory data warehouse system of example 1 and further comprising an interface to interact with users and provide access to the engine, analytical services, and views to perform transactions and data warehouse functions on the database table.

3. The in memory data warehouse system of example 2 wherein the user interface comprises:
a specific analytical user interface utilizing HTML/OData; and
a generic analytical user interface utilizing SQL/MDX.

4. The in memory data warehouse system of any of examples 1-3 wherein the defined views comprise:
query views; and
reuse views.

5. The in memory data warehouse system of any of examples 1-4 wherein the analytical services include a calculation and aggregation engine.

6. The in memory data warehouse system of any of examples 1-5 wherein the analytical services include a predictive analysis services.

7. The in memory data warehouse system of any of examples 1-6 wherein the analytical services include a history and hierarchy handling services.

8. The in memory data warehouse system of any of examples 1-7 wherein the analytical services include cross system analytics services.

9. The in memory data warehouse system of any of examples 1-8 wherein the analytical services include security services.

10. The in memory data warehouse system of any of examples 1-9 wherein the analytical services include planning and simulation services.

11. An in memory data warehouse system executed method comprising:
storing transaction related data in an in memory database table on random access computer readable memory;
storing a set of defined views in computer readable memory over the database table;
executing transaction services and database warehouse services via the in memory database system; and
running analytical services on the database table via the in memory data warehouse system.

12. The method of example 11 and further comprising providing an interface to interact with users and provide access to the engine, analytical services, and views to perform transactions and data warehouse functions on the database table.

13. The method of example 12 wherein providing a user interface comprises:
providing a specific analytical user interface utilizing HTML/OData; and
providing a generic analytical user interface utilizing SQL/MDX.

14. The method of any of examples 11-13 wherein the defined views comprise:
query views; and
reuse views.

15. The method of any of examples 11-14 wherein the analytical services include a calculation and aggregation engine.

16. The method of any of examples 11-15 wherein the analytical services include a predictive analysis services, a history and hierarchy handling services, cross system analytics services, security services, and planning and simulation services.

17. A computer readable storage device having instructions to cause a computer to perform an in memory database executed method, the method comprising:
storing transaction related data in an in memory database table;
storing a set of defined views over the database table;
executing analytical services adapted to provide transaction services and database warehouse services; and
using an engine to run the analytical services on the database table.

18. The computer readable storage device of example 17 wherein the method further comprises providing an interface to interact with users and provide access to the engine, analytical services, and views to perform transactions and data warehouse functions on the database table, wherein providing a user interface comprises:
providing a specific analytical user interface utilizing HTML/OData; and
providing a generic analytical user interface utilizing SQL/MDX.

19. The computer readable storage device of any of examples 17-18 wherein the defined views comprise:
query views; and
reuse views.

20. The computer readable storage device of any of examples 17-19 wherein the analytical services include a calculation and aggregation engine, a predictive analysis services, a history and hierarchy handling services, cross system analytics services, security services, and planning and simulation services.

21. An in memory data warehouse system comprising:
a random access memory to store and manage in memory database tables;
a stored set of defined views of the database tables;
a stored set of analytical services adapted to provide transaction services and predictive analytics, wherein predictive algorithms are invoked via script code; and
an engine to run the analytical services on the database table.

22. The in memory database warehouse system of any of claims 1-21 wherein the script code comprises SQL script code.

23. The in memory database warehouse system of claim 22 wherein the SQL script code reads input data in an order and format expected by a predictive algorithm and calls the predictive algorithm.

24. The in memory database warehouse system of claim 23 wherein the SQL script code further reads stored control parameters of the predictive algorithm.

25. The in memory database warehouse system of claim 23 wherein the SQL script code identifies a results variable to assign to a view's output structure.

26. The in memory database warehouse system of any of claims 1-25 wherein the stored set of defined views includes a control view to expose stored control parameters, a result view, and a query view for predictive analytics algorithms.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. An in-memory data warehouse system comprising:
one or more processors; and
a computer-readable medium coupled with the processor, the computer-readable medium comprising instructions stored thereon that are executable by the one or more processors to cause the in-memory data warehouse system to perform operations comprising:
storing a plurality of virtual data model views as part of a virtual data model layer configured to enrich application data with time-dependent data having a validity period;
wherein each virtual data model view of the plurality of virtual data model views comprises a keep history flag as a property of each data model view that is only set if time-dependent data is maintained for the application data associated with the virtual data model view;
receiving an indication that the keep history flag has been activated in a first virtual data model view of the plurality of virtual data model views, wherein the first virtual data model view is based on one or more tables;

based on determining that the keep history flag has been activated in the first virtual data model view, generating a shadow table with a same structure as the first virtual data model view;
determining that updates were made to at least one table upon which the first virtual data model view is based;
determining whether the updates made to the at least one table have an effect on the first virtual data model view; and
updating the shadow table, based on determining that updates made to the at least one table have an effect on the first virtual data model view.

2. The in-memory data warehouse system of claim 1, wherein determining that updates made to the at least one table have an effect on the first virtual data model view comprises determining additional values for an attribute of the first virtual data model view.

3. The in-memory data warehouse system of claim 1, the operations further comprising:
exposing historical information by enhancing the first virtual data model view.

4. The in-memory data warehouse system of claim 1, the operations further comprising:
processing a transaction on an in-memory database wherein the transaction comprises data having a validity time;
updating the first virtual data model view in response to the transaction being processed; and
storing the validity time information in the shadow table to provide historical access to past time dependent data following expiration of the validity time.

5. The in-memory data warehouse system of claim 1, wherein in order to keep history information, the shadow table is flagged as insert-only and stores only a delta of a tuple with a single timestamp.

6. The in-memory data warehouse system of claim 1, wherein in order to keep history information, the shadow table is flagged as insert-only and stores a full tuple including additional information that is used to determine a time span of its validity.

7. The in-memory data warehouse system of claim 1, wherein the shadow table stores validity period information comprising information that indicates a time span for which the corresponding data is valid.

8. The in-memory warehouse system of claim 1, wherein the shadow table comprises a read-optimized main store of data, and a differential buffer, wherein the differential buffer is a write-optimized insert-only structure.

9. The in-memory warehouse system of claim 8, wherein all inserts, updates, and delete operations are performed on the differential buffer.

10. The in-memory data warehouse system of claim 9, wherein the main store is not touched by any data modifying operation.

11. The in-memory data warehouse system of claim 10, wherein the differential buffer and the main store are merged periodically within a merge process.

12. An in-memory data warehouse system executed method comprising:
storing, using one or more processors, a plurality of virtual data model views as part of a virtual data model layer configured to enrich application data with time-dependent data having a validity period;
wherein each virtual data model view of the plurality of virtual data model views comprises a keep history flag as a property of each data model view that is only set if time-dependent data is maintained for the application data associated with the virtual data model view;
receiving an indication that the keep history flag has been activated in a first virtual data model view of the plurality of virtual data model views, wherein the first virtual data model view is based on one or more tables;
based on determining that the keep history flag has been activated in the first virtual data model view, generating a shadow table with a same structure as the first virtual data model view;
determining that updates were made to at least one table upon which the first virtual data model view is based;
determining whether the updates made to the at least one table have an effect on the first virtual data model view; and
updating the shadow table, based on determining that updates made to the at least one table have an effect on the first virtual data model view.

13. The method of claim 12, wherein determining that updates made to the at least one table have an effect on the first virtual data model view comprises determining additional values for an attribute of the first virtual data model view.

14. The method of claim 12, the operations further comprising:
exposing historical information by enhancing the first virtual data model view.

15. The method of claim 12, further comprising:
processing a transaction on an in-memory database wherein the transaction comprises data having a validity time;
updating the first virtual data model view in response to the transaction being processed; and
storing the validity time information in the shadow table to provide historical access to past time dependent data following expiration of the validity time.

16. The method of claim 12, wherein in order to keep history information, the shadow table is flagged as insert-only and stores only a delta of a tuple with a single timestamp.

17. The method of claim 12, wherein in order to keep history information, the shadow table is flagged as insert-only and stores a full tuple including additional information that is used to determine a time span of its validity.

18. The method of claim 12, wherein the shadow table comprises a read-optimized main store of data, and a differential buffer, wherein the differential buffer is a write-optimized insert-only structure.

19. The method of claim 18, wherein all inserts, updates, and delete operations are performed on the differential buffer.

20. A non-transitory computer readable storage device having instructions to cause one or more processors to perform operations comprising:
storing a plurality of virtual data model views as part of a virtual data model layer configured to enrich application data with time-dependent data having a validity period;
wherein each virtual data model view of the plurality of virtual data model views comprises a keep history flag as a property of each data model view that is only set if time-dependent data is maintained for the application data associated with the virtual data model view;
receiving an indication that the keep history flag has been activated in a first virtual data model view of the plurality of virtual data model views, wherein the first virtual data model view is based on one or more tables;

based on determining that the keep history flag has been activated in the first virtual data model view, generating a shadow table with a same structure as the first virtual data model view;

determining that updates were made to at least one table upon which the first virtual data model view is based;

determining whether the updates made to the at least one table have an effect on the first virtual data model view; and updating the shadow table, based on determining that updates made to the at least one table have an effect on the first virtual data model view.

21. The non-transitory computer readable storage device of claim 20, wherein determining that updates made to the at least one table have an effect on the first virtual data model view comprises determining additional values for an attribute of the first virtual data model view.

22. The non-transitory computer readable storage device of claim 20, the operations further comprising:

exposing historical information by enhancing the first virtual data model view.

23. The non-transitory computer readable storage device of claim 20, the operations further comprising:

processing a transaction on an in-memory database wherein the transaction comprises data having a validity time;

updating the first virtual data model view in response to the transaction being processed; and storing the validity time information in the shadow table to provide historical access to past time dependent data following expiration of the validity time.

* * * * *